United States Patent [19]

Grasham

[11] 3,969,830

[45] July 20, 1976

[54] COLOR ENCODING-DECODING METHOD

[76] Inventor: James A. Grasham, P.O. Box 518, Kentfield, Calif. 94904

[22] Filed: Sept. 15, 1975

[21] Appl. No.: 613,315

Related U.S. Application Data

[63] Continuation of Ser. No. 311,229, Dec. 1, 1972, abandoned.

[52] U.S. Cl. .................................................. 35/2
[51] Int. Cl.² .......................................... G09C 1/00
[58] Field of Search ................................. 35/1–3; 283/6–7, 11, 17

[56] References Cited
UNITED STATES PATENTS

| | | | |
|---|---|---|---|
| 2,952,080 | 9/1960 | Avakian et al. | 35/2 |
| 2,969,531 | 1/1961 | Stewart | 35/2 X |
| 3,234,663 | 2/1966 | Ferris et al. | 35/2 |
| 3,279,095 | 10/1966 | Carlson | 35/2 |

Primary Examiner—Louis G. Mancene
Assistant Examiner—John H. Wolff

[57] ABSTRACT

A method of using colors to encode and decode graphic material such as writing or a photograph. Colored graphic material and a two colored pattern are superimposed. Colors mix subtractively to form a multicolored image. This image is photographed in terms of light and dark to form an encoded graphic. Because of the colors used in encoding, the encoded graphic is a mixture of positive and negative portions of the original material. Decoding is accomplished by superimposing another colored pattern, similar to the first pattern, and an appropriately colored form of encoded graphic. A subtractive color mixture of colors in the superimposed pattern and encoded graphic forms an image that to the eye is a reconstruction of the original graphic material.

22 Claims, 2 Drawing Figures

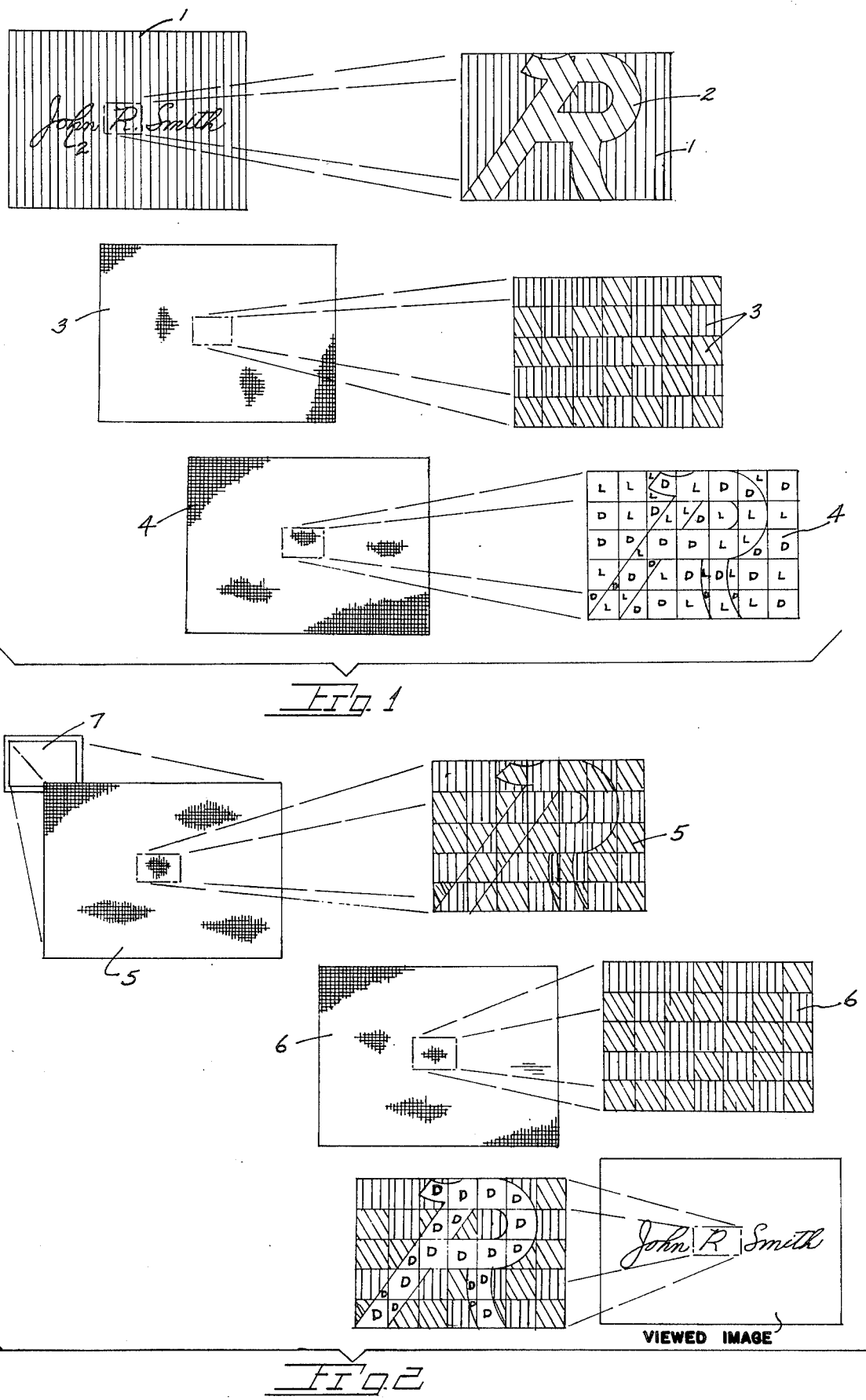

COLOR ENCODING-DECODING METHOD

BACKGROUND OF THE INVENTION

This is a continuation of application Ser. No. 311,229 filed Dec. 1, 1972 now abandoned.

The invention is a method of encoding and decoding graphic material such as writing or a photograph. There is a recognized need for such a method and a number of such methods have been devised. One that has found commercial use is described in the U.S. Pat. No. 2,952,080 of Avakian et al. Avakian et al have dummy bits mix with information bits to form an encoded graphic. This encoded graphic is decoded quite simply by superimposing an appropriate mask and the encoded graphic. A disadvantage of a method utilizing dummy bits is that the original material can never be fully restored during decoding. Another method, described in the U.S. Pat. No. 3,234,663 of Ferris et al, forms an encoded graphic that is composed of a mixture of small positive and negative areas, each positive or negative area being, respectively, a positive or negative image of corresponding portions of the original material. In the method of Ferris, the original material is fully restored, but the decoding process is relatively complicated-involving the exposing and developing of film-making the method unsuitable for all possible uses. The present invention, like Ferris et al, forms an encoded graphic consisting of a mixture of positive and negative portions of the original material, and like Ferris et al the original material is fully reconstructed during decoding. Encoding and decoding are, however, accomplished by a quite different method with decoding using a masking system similar in some ways to that of Avakian et al.

SUMMARY OF THE INVENTION

The present invention is a method of using colors for encoding and/or decoding graphic material, e.g., a signature. In the encoding process, an encoded graphic is formed. This encoded graphic is a mixture of corresponding positive and negative portions of the original graphic material. If the pattern of positive and negative portions is well chosen, it will be difficult or impossible for an unauthorized person to "read through" the encoded graphic and learn what the original material consists of.

To encode, using colors, the original material must be composed of two colors, neither of which is black or white. A pattern of two transparent colors (usually the same two colors that are in the original material) and the original material are superimposed. Pattern colors mix in a subtractive manner with the colors of the original material they overlie and a multicolored image is formed. The image is recorded on monochromatic film. Because of the way the colors are chosen, where one pattern color overlies the original material, the corresponding area on the film will be a positive image of the original material, and where the other pattern color overlies the original material, the corresponding area on the film will be a negative image of the original material. The film constitutes one form of the encoded graphic.

Decoding is similar to encoding. A transparent colored pattern-similar to the one used for encoding-is placed over a suitably colored encoded graphic. Again, none of the colors used is black or white. Colors mix and a multicolored image is formed. This image is a reconstruction of the original material and can be viewed directly or recorded on film.

BRIEF DESCRIPTION OF THE DRAWING

In the accompanying drawing:

FIG. 1 is a composite view of an original signature card, a first pattern, and a resulting light and dark photograph; corresponding areas from each of the same shown enlarged and located to the right hand side;

FIG. 2 is a composite view of a two color encoded signature card, a second pattern, and a visual image resulting from the combination of the encoded signature card and the second pattern; corresponding areas of each of the same being shown enlarged.

DETAILED DESCRIPTION OF THE PREFERRED EMBODIMENT

The present method of encoding-decoding is a method that might be used by a bank for encoding a customer's signature in a bank book. The encoded signature would be decoded at the bank and used for identification purposes. The use of the present method will be illustrated in a bank system.

A red signature card 1 is signed by a bank customer, the signature at 2 in green opaque ink. This signed signature card is the graphic material to be encoded. A pattern 3 having red and green transparent colors and the signed signature card 1 are superimposed. Here, the pattern 3 colors are arranged on a plastic base material (pattern 3 might, e.g., be a color film transparency), but in other forms of the invention the pattern might be colored inks placed directly on signature card 1.

The colors of pattern 3 mix in a subtractive manner with the signature card 1 colors they overlie. In particular, red and green of the pattern mix, respectively, with green and red of the signature card to form dark colors, and red and green of the pattern mix, respectively, with red and green of the signature card to form, respectively, the relatively lighter colors of red and green.

A record of the relative lightness and darkness of the colors formed by the superimposition is made with a camera on black and white film 4. Lighting is adjusted so that all superimpositions of like colors (red on red or green on green) record in the same way in corresponding portions on the film and produce the same densities on the developed film. Similarly, all superimpositions of unlike colors (red on green or green on red) record in the same way in corresponding portions on the film and produce the same densities on the developed film. Film 4 in FIG. 1 is shown developed as a positive. The light (L) and dark (D) densities resulting from the superimpositions are indicated. Ideally, film 4 should be a high contrast variety as used in the graphic arts. The colors used here necessitate the film be panchromatic. When high contrast film is used, L and D portions of film 4 would be, respectively, clear and opaque black.

Film 4 is a mixture of positive and negative areas of corresponding portions of signature card 1, and film 4 is an encoded form of signature card 1. In particular, in areas of film 4 corresponding to red of pattern 3, red and green of signature card 1 have been represented on film 4, respectively, as light and dark. On the other hand, in areas of film 4 corresponding to green of pattern 3, red and green of signature card 1 have been represented on film 4, respectively, as dark and light. Thus, areas of film 4 corresponding to red and green of pattern 3 have recorded corresponding portions of signature card 1, respectively, as positive (say) and negative images.

To decode, generally speaking, the encoding process is repeated. Film 4 is used to form the encoded signature 5 to be placed, e.g., within an opening in the customer's bank book. Here, encoded card 5 is composed of transparent red and green colors on a plastic base. Opaque colors can also work. Encoded card 5 can be prepared from film 4 by any of several known printing processes. It is possible that encoded card 5 could be film 4 if, e.g., opaque colors are utilized and a green dye or ink is introduced to the emulsion of high contrast film 4, and then green colored film 4 is mounted on a red back ground in the bank book. It is also possible to use a film 4 consisting of light and dark portions in the bank book, but the entire original signature card 1 is not reconstructed during decoding.

For decoding encoded card 5, a second pattern at 6 is provided the bank, said second pattern having transparent red and green areas identically arranged to the first pattern 3. Again, the colors are located on a transparent plastic base. The second pattern is superimposed by suitable registration means over signature card 5 with the superimposed pair being placed over illumination means 7. Superimposed colors will mix subtractively and the original signature, as typified by the initial R will appear as a dark image with the dark areas resulting from a mismatching of red and green colors on pattern 6 and the encoded signature card 5. The other or background areas of the image resulting from a superimposition of matching colors. Accordingly, the original signature of card 1 is reconstructed with dark areas of the image corresponding to green of signature card 1, and lighter red and green areas of the image corresponding to red of signature card 1. During superimposition of pattern 6 and encoded card 5, red and green of pattern 6 coincide with, respectively, positive and negative areas of encoded card 5. It can be said that red of pattern 6 leaves the positive areas of encoded card 5 positive in the resulting image, while green of pattern 6 changes negative portions of encoded card 5 to positive in the resulting image.

Since decoding is done visually after superimposing pattern 6 and card 5, since it may not be necessary to record the resultant image on film, and since the eye can discriminate hue as well as brightness, a wider range of colors can be used for decoding than for encoding. It is sometimes possible to decode an encoded graphic by optically superimposing a pattern and having overlying colors mix additively. Also, crossed and uncrossed polarizing means similar to matched and mismatched colors, can be used for both encoding and decoding. For purposes of this specification and claims, where applicable, the word "color" defined broadly enough to apply to the polarization of light.

To encode continuous tone photographs, a black and white photograph must first be transformed into an appropriately colored version. If black is changed to green and white to red, then shades of gray would have to be appropriate additive mixtures of red and green. The film used for encoding would be continuous tone.

By proper choice of pattern 3, signature 2 will not be discernable by viewing encoded card 5. The nature of the material to be encoded may determine the nature of the pattern used for encoding. Photographs, e.g., may be better encoded by one type of pattern, signatures by another. If a random collection of red and green squares, as in pattern 3, is used to encode a signature, it may be deemed desirable-at some point in the encoding process-to digitalize the signature or an encoded form of the signature into square units so that the final encoded signature consists of only red and green square areas. That is, there would be no broken squares as in encoded signature card 5. Whatever pattern is used, a red and green pattern like card 5 is more difficult to "see through" than its light and dark counterpart, film 4, because there is less contrast between red and green than between light and dark. If the squares of pattern 3 are made small enough, during decoding, the red and green squares of the viewed image will blend together visually to form a single color.

While I have shown but a few embodiments of the invention, it will be apparent to those skilled in the art that the invention may be embodied still otherwise without departing from the spirit and scope of the invention.

Having thus described the invention what is desired to be secured under a Letters Patent is:

1. A method of encoding and decoding graphic material having first and second colors, said method comprising the steps:

forming a graphic having first and second colors; said first and second graphic colors being located in first areas of said graphic to correspond to, respectively, said first and second material colors; said first and second graphic colors being located in second areas of said graphic to correspond to, respectively, said second and first material colors; said graphic constituting an encoded form of said material;

superimposing a first pattern of first and second colors and said graphic; said first and second first-pattern colors located to coincide during superimposition with, respectively, said first and second graphic areas; said first-pattern colors mixing with the graphic colors they overlie to form a multicolored image that is a reconstruction of said material.

2. The method as recited in claim 1 wherein said superimposing step includes having said first and second first-pattern colors mixing with, respectively, the first and second graphic colors they overlie to form, respectively, first and second image colors; said first and second image colors corresponding to said first material color; and having said first and second first-pattern colors mixing with, respectively, the second and first graphic colors they overlie to form at least one additional image color, said at least one additional image color corresponding to said second material color.

3. The method as recited in claim 2 wherein said step of superimposing includes superimposing said first pattern and graphic physically and having overlying colors mix subtractively.

4. The method as recited in claim 1 wherein said step of forming a graphic further comprises:

superimposing a second pattern of first and second colors and said graphic material, second-pattern colors mixing with the material colors they overlie;

forming said graphic of said first and second colors; said graphic having said first graphic color corresponding to a mixture of said first second-pattern color and said first material color, said first graphic color also corresponding to a mixture of said second second-pattern color and said second material color; said second graphic color corresponding to a mixture of said first second-pattern color and said second material color, said second graphic color also corresponding to a mixture of said second second-pattern color and said first material color; said first and second graphic areas thereby corresponding, respectively to said first and second second-pattern colors.

5. The method as recited in claim 4 wherein said step of forming a graphic further comprises:
   forming a record of said color mixtures formed by a superimposition of said second pattern and said graphic material on a light sensitized medium, a mixture of first and second second-pattern colors and, respectively, said first and second material colors being recorded on corresponding portions of said record in a first way, and a mixture of said first and second second-pattern colors and, respectively, said second and first material colors being recorded on corresponding portions of said record in a second way;
   forming said graphic from said record and having said first and second graphic colors representing corresponding portions of said record recorded in, respectively, said first and second ways.

6. The method as recited in claim 5 wherein said step of superimposing said second pattern and said material includes physically superimposing said second pattern and said material and having overlying colors mix in a subtractive manner.

7. The method as recited in claim 6 wherein said step of superimposing said first pattern and said graphic includes having said first and second first-pattern colors mixing with, respectively, the first and second graphic colors they overlie to form, respectively, first and second image colors, said first and second image colors corresponding to said first material color, and having said first and second first-pattern colors mixing with, respectively, the second and first graphic colors they overlie to form at least one additional image color, said at least one additional image color corresponding to said second material color.

8. The method as recited in claim 7 wherein said step of superimposing said first pattern and said graphic includes superimposing said first pattern and graphic physically and having overlying colors mix subtractively.

9. The method as recited in claim 3 wherein said step of forming a graphic further comprises:
   superimposing a second pattern of first and second colors and said graphic material, second-pattern colors mixing with the material colors they overlie;
   forming said graphic of said first and second colors; said graphic having said first graphic color corresponding to a mixture of said first second-pattern color and said first material color, said first graphic color also corresponding to a mixture of said second second-pattern color and said second material color; said second graphic color corresponding to a mixture of said first second-pattern color and said second material color, said second graphic color also corresponding to a mixture of said second second-pattern color and said first material color; said first and second graphic areas thereby corresponding, respectively to said first and second second-pattern colors.

10. The method as recited in claim 9 wherein said step of forming a graphic further comprises:
    forming a record of said color mixtures formed by a superimposition of said second pattern and said graphic material on a light sensitized medium, a mixture of first and second second-pattern colors and, respectively, said first and second material colors being recorded on corresponding portions of said record in a first way, and a mixture of said first and second second-pattern colors and, respectively, said second and first material colors being recorded on corresponding portions of said record in a second way;
    forming said graphic from said record and having said first and second graphic colors representing corresponding portions of said record recorded in, respectively, said first and second ways.

11. The method as recited in claim 1 wherein said step of forming a graphic further comprises:
    superimposing a second pattern of first and second colors and said graphic material, second-pattern colors mixing in a subtractive manner with material colors they coincide, a mixture of said first and second second-pattern colors and, respectively, said first and second material colors forming lighter colors than a mixture of said first and second second-pattern colors and, respectively, said second and first material colors;
    forming said graphic of said first and second colors, said graphic having said first and second colors located to correspond to, respectively, said lighter and darker color mixtures, said first and second areas of said graphic thereby corresponding to, respectively, said first and second second-pattern colors.

12. The method as recited in claim 11 wherein said step of forming a graphic further comprises:
    forming a record of colors formed by said superimposition of said second pattern and said graphic material on a light sensitized medium, portions of said record corresponding to said lighter and darker colors representing said lighter and darker colors in, respectively, first and second ways;
    forming said graphic from said record, said first and second graphic colors located to correspond to portions of said record recorded in, respectively, said first and second ways.

13. The method as recited in claim 12 wherein said step of superimposing said first pattern and said graphic includes having said first and second first-pattern colors mixing with, respectively, the first and second graphic colors they overlie to form, respectively, first and second image colors, said first and second image colors corresponding to said first material color; and having said first and second first-pattern colors mixing with, respectively, the second and first graphic colors they overlie to form at least one additional image color, said at least one additional image color corresponding to said second material color.

14. The method as recited in claim 13 wherein said step of superimposing said first pattern and said graphic includes superimposing said first pattern and said graphic physically and having overlying colors mix subtractively.

15. The method as recited in claim 2 wherein said step of forming a graphic further comprises:
    superimposing a second pattern of first and second colors and said graphic material, second-pattern colors mixing in a subtractive manner with material colors they coincide, a mixture of said first and second second-pattern colors and, respectively, said first and second material colors forming lighter colors that a mixture of said first and second second-pattern colors and, respectively, said second and first material colors;

forming said graphic of said first and second colors, said second graphic having said first and second colors located to correspond to, respectively, said lighter and darker color mixtures, said first and second areas of said graphic thereby corresponding to, respectively, said first and second second-pattern colors.

16. A method of encoding and decoding colored graphic material comprising the steps:

forming a graphic having first and second areas, said first and second areas having, respectively, positive and negative images of corresponding portions of said graphic material;

combining a first pattern of first and second colors and said graphic, said first and second first-pattern colors located to coincide, respectively, with said first and second graphic areas, an interaction of said first-pattern colors and the graphic colors forming a reconstruction of said graphic material.

17. The method as recited in claim 16 wherein said step of combining includes combining said first pattern and graphic by superimposition, said first and second first-pattern colors mixing with the graphic colors they overlie to form, respectively, positive and negative images, thereby forming positive images of the graphic material and reconstructing said material.

18. The method as recited in claim 17 wherein said step of combining said first pattern and graphic includes having superimposed colors mixing in a subtractive manner.

19. The method as recited in claim 16 wherein said step of forming a graphic further comprises:

physically superimposing a second pattern of first and second colors and said graphic material, pattern colors mixing in a subtractive manner with graphic colors they overlie to form colors of varying brightnesses, said first and second second-pattern colors mixing with graphic material colors to form, respectively, positive and negative images of said graphic material;

forming said graphic, said graphic having colors representing said colors in said mixture according to the brightness of said mixed colors, said first and second graphic areas corresponding to said first and second second-pattern colors, respectively.

20. The method as recited in claim 19 wherein said stop of forming a graphic further comprises:

forming a record of said resulting color mixtures, said colors being represented differently in said record according to their different brightnesses;

forming said graphic from said record, different graphic colors being determined according to different representations of said mixed colors in said record.

21. The method as recited in claim 20 wherein said step of combining includes combining said first pattern and graphic by superimposition, said first and second first-pattern colors mixing with the graphic colors they overlie to form respectively, positive and negative images, thereby forming positive images of the graphic material and reconstructing said material.

22. The method as recited in claim 21 wherein said step of combining said first pattern and graphic includes having superimposed colors mixing in a subtractive manner.

* * * * *